United States Patent
Lindell (10) Patent No.: US 7,209,084 B2
(45) Date of Patent: Apr. 24, 2007

(54) ANTENNA FOR PORTABLE COMMUNICATION DEVICE EQUIPPED WITH A HINGE

(75) Inventor: Bo Lindell, Lidingö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 10/536,598

(22) PCT Filed: Nov. 20, 2003

(86) PCT No.: PCT/EP03/13001

§ 371 (c)(1),
(2), (4) Date: May 26, 2005

(87) PCT Pub. No.: WO2004/049502

PCT Pub. Date: Jun. 10, 2004

(65) Prior Publication Data

US 2006/0071863 A1    Apr. 6, 2006

Related U.S. Application Data

(60) Provisional application No. 60/431,505, filed on Dec. 4, 2002.

(30) Foreign Application Priority Data

Nov. 26, 2002    (EP) ................................ 02026232

(51) Int. Cl.
*H01Q 1/24* (2006.01)
*H04B 1/38* (2006.01)

(52) U.S. Cl. ................ 343/702; 343/895; 455/90; 455/550; 455/575

(58) Field of Classification Search ............... 343/702, 343/895, 846; 455/90, 550, 575
See application file for complete search history.

(56) References Cited

U.S. PATENT DOCUMENTS

| | | | |
|---|---|---|---|
| 4,992,799 A | 2/1991 | Garay | 343/702 |
| 6,097,339 A | 8/2000 | Filipovic et al. | 343/702 |
| 6,272,356 B1 * | 8/2001 | Dolman et al. | 455/575.3 |
| 6,307,511 B1 | 10/2001 | Ying et al. | 343/702 |
| 6,337,666 B1 * | 1/2002 | Bishop | 343/795 |
| 6,697,022 B2 * | 2/2004 | Ponce De Leon et al. | 343/702 |

(Continued)

FOREIGN PATENT DOCUMENTS

WO    WO 00/28617    5/2000

(Continued)

*Primary Examiner*—Tho Phan
*Assistant Examiner*—Chuc Tran
(74) *Attorney, Agent, or Firm*—Myers Bigel Sibley Sajovec, PA (57) ABSTRACT

A portable communication device includes a first part including a first antenna element located within and extending through a portion of the first part and radio circuit feeding antenna elements, a second part hingedly joined to an end of the first part for providing at least one open and one closed position of the phone, and a hinge element connected to the first and second parts. The hinge element stretches along the end of the first part for providing rotation of one part in relation to the other part around a first axis having a first and second end. The hinge element includes a second antenna element. The radio circuit is connected between the first and second antenna elements.

19 Claims, 5 Drawing Sheets

U.S. PATENT DOCUMENTS

| | | | |
|---|---|---|---|
| 6,898,282 B2* | 5/2005 | Cho | 379/428.01 |
| 6,903,694 B2* | 6/2005 | Kim | 343/702 |
| 7,010,334 B2* | 3/2006 | Saito | 455/575.7 |
| 2002/0084938 A1* | 7/2002 | Kim | 343/702 |
| 2003/0129950 A1* | 7/2003 | Kwak | 455/90 |
| 2003/0190896 A1* | 10/2003 | Ota et al. | 455/90.3 |

FOREIGN PATENT DOCUMENTS

| | | |
|---|---|---|
| WO | WO 02/25769 A1 | 3/2002 |
| WO | WO 02/37600 A1 | 5/2002 |

* cited by examiner

ANTENNA FOR PORTABLE COMMUNICATION DEVICE EQUIPPED WITH A HINGE

RELATED APPLICATIONS

The present application is a 35 U.S.C. §371 national phase application of PCT International Application No. PCT/EP2003/013001, having an international filing date of Nov. 20, 2003, and claiming priority to European Patent Application No. 02026232.5, filed Nov. 26, 2002, and U.S. Provisional Application No. 60/431,505, filed Dec. 4, 2002, the disclosures of which are incorporated herein by reference in their entireties. The above PCT International Application was published in the English language and has International Publication No. WO 2004/049502 A1.

TECHNICAL FIELD OF THE INVENTION

The present invention relates to the field of antennas and more particularly to a portable communication device with a hinge including an in-built antenna as well as an antenna arrangement for a portable communication device, which includes a hinge.

DESCRIPTION OF RELATED ART

There is a trend within the filed of portable communicating devices, and especially within the field of cellular phones to have the antenna in-built in the phone itself. At the same time the frequency bands needed for such phones need to be broad, which is in many cases a conflicting interest.

One type of such in-built antenna is described in WO-0237600. Here a cellular phone having an antenna system provided within the casing of the phone is described. The antenna is made up of a first antenna element in the form of the shielding, casing or chassis of the phone and is fed against a second antenna element functioning as a counterpoise provided at one end of the antenna. The counterpoise is here provided within the main body of the phone, which unnecessarily limits the size of the first antenna element, which needs to take up as much as possible of the main part of the phone in order to function best.

There is furthermore a trend towards clamshell phones, which have two parts hingedly connected to each other. Normal antennas in cellular telephony are so called PIFA (planar inverted-F Antennas). These antennas require a substantial space inside the phone and are sensitive to folding and unfolding. If placed on a twistable upper half, usually containing the main display, such a PIFA will be turned to the inside of the part of the phone, preventing any useful radiation.

A typical clam-shell phone is described in U.S. Pat. No. 6,097,339. The practice here is to provide the antenna on an end of one part beside the hinge interconnecting the two parts. This antenna would furthermore be hindering any possible twisting of the upper part of the phone if this was possible. Since the antenna is protruding from the phone body, it makes the phone larger and more bulky than it has to be, especially when folded.

There is therefore a need for providing an antenna for a portable communication device having two parts joined by a hinge, which does not protrude from the body of the phone and has a better broadband performance.

SUMMARY OF THE INVENTION

The present invention is directed towards solving the problem of providing an antenna that does not protrude from any of the parts of a portable communication device having two parts joined to each other by a hinge and that lets a first antenna element be as large as possible for better efficiency, while at the same time providing better broadband performance of the whole antenna.

One object of the present invention is thus to provide a portable communication device having two parts joined to each other by a hinge and including an antenna that does not protrude from any of the parts of a portable communication device and lets a first antenna element be as large as possible for better efficiency, while at the same time providing better broadband performance for the whole antenna.

According to a first aspect of the present invention, this object is achieved by a portable communication device comprising:

a first part comprising a first antenna element located within and extending through a major portion of the first part and a radio circuit feeding antenna elements in the device, a second part hingedly joined to an end of the first part for providing at least one open and one closed position of the phone, and a hinge element connected to the first and second parts, stretching along the end of the first part for providing rotation of one part in relation to the other part around a first axis and having a first and second end, said hinge element comprising a second antenna element, wherein the radio circuit is connected between the first and second antenna elements for feeding them.

A second aspect of the present invention is directed towards a portable communication device including the features of the first aspect, wherein the second antenna element is provided in the interior of the hinge element.

A third aspect of the present invention is directed towards a portable communication device including the features of the first aspect, wherein the second antenna element encircles the axis of rotation defined by the hinge element.

A fourth second aspect of the present invention is directed towards a portable communication device including the features of the first aspect, wherein the radio circuit is connected to the second antenna element between the first and second ends of the hinge element.

A fifth aspect of the present invention is directed towards a portable communication device including the features of the fourth aspect, wherein the radio circuit is connected to the second antenna element in proximity of the second end of the hinge element.

A sixth aspect of the present invention is directed towards a portable communication device including the features of the first aspect, wherein the radio circuit is connected to the first antenna element at a position close to the connecting point between the second antenna element and the radio circuit.

A seventh aspect of the present invention is directed towards a portable communication device including the features of the first aspect, wherein the first antenna element is electrically connected to the second antenna element at the first end of the hinge element, thereby providing a gap between the first and second antenna elements, the length of which is essentially defined by the first and second ends of the hinge element.

An eighth aspect of the present invention is directed towards a portable communication device including the features of the seventh aspect, wherein the electrical connection between the first and second antenna element provides a screen for conductors provided between at least the first part and the hinge.

A ninth aspect of the present invention is directed towards a portable communication device including the features of the eight aspect, wherein the electrical connection between the first and second antenna elements is provided by the screening of a screened cable.

A tenth aspect of the present invention is directed towards a portable communication device including the features of the first aspect, further comprising a third antenna element located within and extending through a major portion of the second part and being electrically connected to the second antenna element at least at the first end of the hinge element.

An eleventh aspect of the present invention is directed towards a portable communication device including the features of the tenth aspect, wherein the electrical connection between the second and third antenna element provides a screen for conductors provided between at least the second part and the hinge.

A twelfth aspect of the present invention is directed towards a portable communication device including the features of the eleventh aspect, wherein the electrical connection between the second and third antenna elements is provided by the screening of a screened cable.

A thirteenth aspect of the present invention is directed towards a portable communication device including the features of the tenth aspect, wherein the second and third antenna elements are only electrically connected at the first end of the hinge element, thereby providing a gap between the third and second antenna elements, the length of which is essentially defined by first and second ends of the hinge element.

A fourteenth aspect of the present invention includes the features of the tenth aspect, wherein the third and second antenna elements are provided with at least one further connection arranged to interconnect the elements when in the open position of the device and to be disconnected the when the device is in the closed position.

A fifteenth aspect of the present invention includes the features of the fourteenth aspect, wherein the further connection is a continuous connection essentially provided along the whole length of the hinge element.

A sixteenth aspect of the present invention includes the features of the fourteenth aspect, further including more than one further connection between the second and third antenna elements.

A seventeenth aspect of the present invention includes the features of the tenth aspect, wherein the second part includes a first section connected to the hinge element and a second section, where the second section is rotatable around a second axis in relation to the first section, said second axis being provided essentially perpendicular to the first axis.

An eighteenth aspect of the present invention includes the features of the seventeenth aspect, wherein the third antenna element includes a first and second section, the first section of which is provided in the first section of the second part and the second section of which is provided in the second section of the second part, said first and second parts of the third antenna section being electrically connectable to each other along the whole interface between the first and second sections of the second part.

A nineteenth aspect of the present invention includes the features of the first aspect, wherein the radio circuit includes at least one tuning network for tuning the antenna to one or more frequency bands.

A twentieth aspect of the present invention is directed towards a portable communication device including the features of the first aspect, in which it is a cellular phone.

Another object of the present invention is directed towards providing an antenna arrangement for a portable communication device having two parts joined to each other by a hinge element, where the antenna does not protrude from any of the parts and lets a first antenna element be as large as possible for better efficiency.

According to a twenty-first aspect of the present invention, this object is achieved by an antenna arrangement to be provided in a portable communication device having a first part including a radio circuit feeding antenna elements in the device, a second part hingedly joined to an end of the first part, and a hinge element connected to the first and second parts and providing an open and a closed position of the portable communication device, the hinge element stretching along the end of the first part for providing rotation of one part in relation to the other part around a first axis and having a first and second end, wherein the antenna arrangement comprises:

a first antenna element to be located within and extending through a major portion of the first part of the portable communication device and to be connected to the radio circuit, and a second antenna element to be located in the hinge element of the portable communication device and also to be connected to the radio circuit.

The invention has the following advantages. It allows the first antenna element to be made as large as possible while at the same time not having any protruding bulky parts, since the second antenna element is placed in the hinge element. It also provides good broadband properties. The antenna can be provided in a phone where one part has two sections that can be twisted in relation to each other. The antenna according to the invention will not hinder such twisting or have its efficiency degraded by such twisting.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

A portable communication device according to the invention will now be described in relation to a cellular phone, which is a preferred variation of the invention. The phone is furthermore preferably a so-called clamshell phone. The portable communication device can be another type of device though, like a cordless phone, a communication module, a PDA or any other type of portable device communicating with radio waves. There will most likely be a number of varying portable communication devices in the future when the $3^{rd}$ generation cellular systems are implemented, which require good broadband performance.

Figure 1:
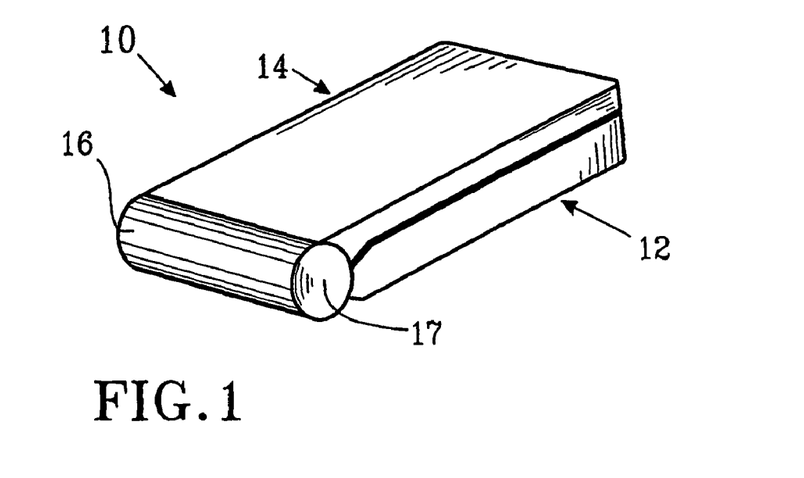
FIG. 1 schematically shows a perspective view of a clam-shell phone according to the invention in a closed position, FIG. 2 schematically shows a perspective view of a clam shell phone according to the invention in an open position.

FIG. 1 schematically shows a perspective view of a clamshell phone according to the invention. The phone 10 includes a first and a second part 12 and 14, where the second part 14 can be rotated round the end of the first part 12. In the figure the phone is shown in a closed position. Here it is worth noting that there is no antenna protruding from the phone. The antenna is in-built.

Figure 2:
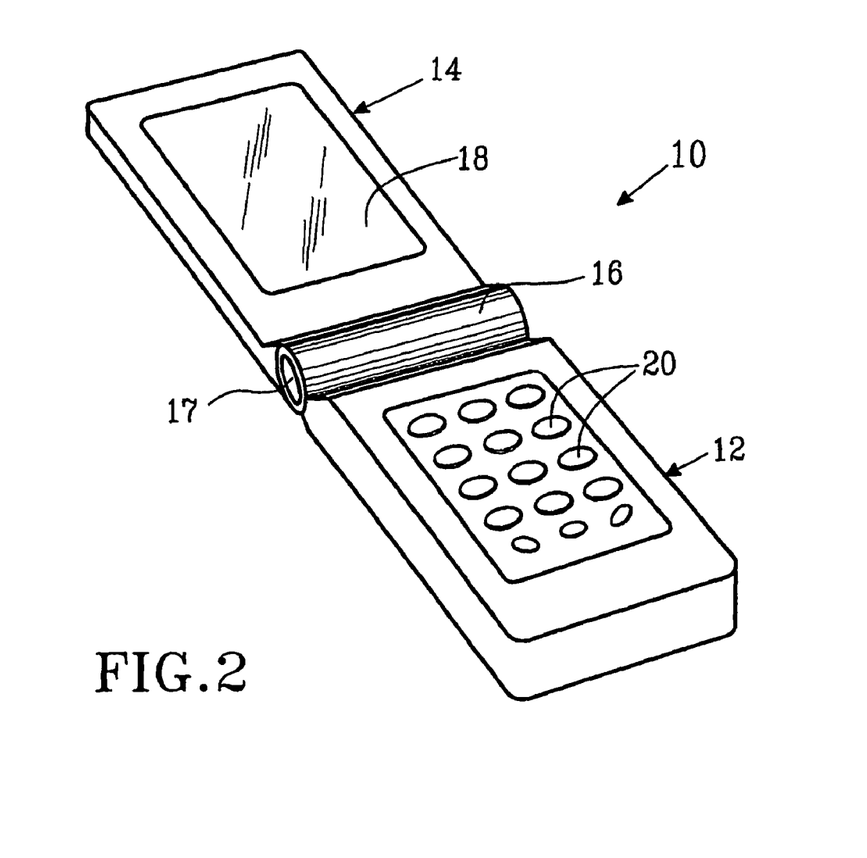

FIG. 2 schematically shows another perspective view of the clamshell phone 10 according to the invention. Now the second part 14 has been rotated in relation to the first part 12 in order to open the phone. As can be seen the first part includes a keypad 20 on it's interior side, while the second part 14 includes a display.

Figure 3:
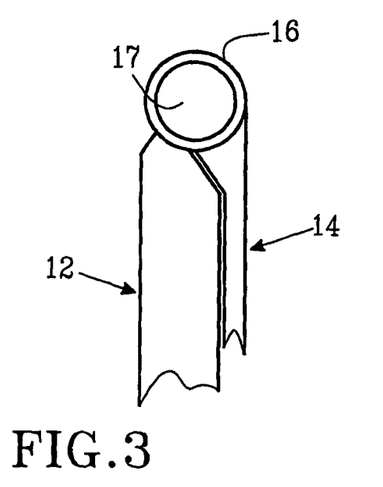
FIG. 3 shows a side view of the different parts in a hinging section of the phone according to the invention, when the phone is in a closed position.
Figure 4:
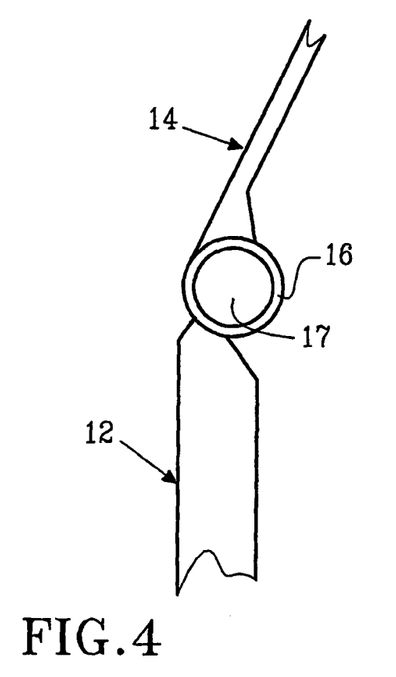
FIG. 4 shows a side view of the different parts in the hinging section of the phone according to the invention, when the phone is in an open position, FIG. 5 schematically shows a top view of antenna elements in the hinging section of a clam-shell phone according to a first embodiment of the invention, when the phone is in an open position, FIG. 6 schematically shows a top view of the antenna elements in the clam-shell phone according to the first embodiment of the invention, when the phone is in a closed position, FIG. 7 schematically shows a top view of the antenna elements in the clam-shell phone according to the first embodiment of the invention, when the phone is in a open position, FIG. 8 schematically shows a top view of antenna elements of a clam-shell phone according to a second embodiment of the invention, when the phone is in an open position, FIG. 9 schematically shows a top view of antenna of a clam-shell phone according to a third embodiment of the invention, when the phone is in an open position, and FIG. 10 schematically shows a top view of antenna elements of a clam-shell phone according to a fourth embodiment of the invention, when the phone is in an open position.

FIGS. 3 and 4 show side views of the different parts in a hinging section of the phone according to the invention, when the phone is in a closed and an open position, respectively. In these figures there is shown a first end 17 of a hinge element 16 interconnecting the first part 12 with the second part 14. The hinge has mechanical joints at both ends. The joint at the first end 17 is electrically conducting, while the joint at the opposite end performs only mechanical functions and is non-conducting, i.e. has an electrically insulating part in the joint. The joint at the first end 17 also carries two screened cable connections, which will be described in more detail later on. This hinge element 16 will play an important part of the present invention, which will be described shortly. The hinging action of the hinge is an ordinary hinging action.

Figure 5:
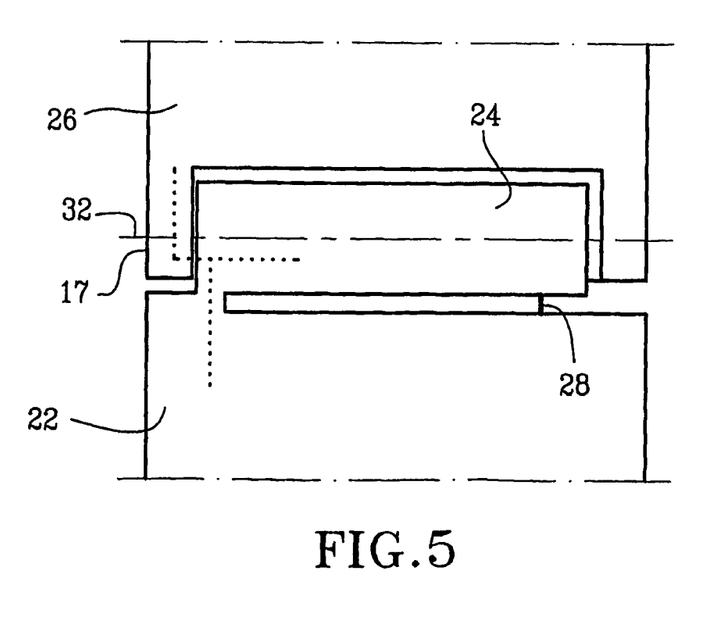

FIG. 5 schematically shows a top view of the antenna elements in the hinging section of the clamshell phone according to a first embodiment of the invention, when the phone is in an open position. The antenna includes a first antenna element 22 provided in the first part, which is electrically connected to a second cylindrical antenna element 24 at the first end. The second antenna element is provided in the interior of the hinge element and is preferably hollow. The second antenna element 24 as well as the hinge element extend along the entire end of the phone and a third antenna section 26 is provided in the second part of the phone and is electrically connected to the second antenna element 24 at the first end 17 of the hinge element. The second antenna element 24 has a second end located at a second end of the hinge element. This end is not electrically connected to the first and third antenna elements 22 and 26, and thus a first gap is provided between the first and second antenna elements 22 and 24 stretching inwards from the second end of the second antenna element up to a point where the first and second antenna elements are electrically connected. In same way a second gap is provided between the second and third antenna elements 24 and 26 stretching from the second end to the first end 17 where the second and third antenna elements are electrically connected. It is important to point out that with a gap is meant a space where no conducting elements are placed. Different isolators or plastic material can therefore be placed here. An insulated conductor 28 for connection with a radio circuit (not shown) is connected to the second antenna element 24, close to the second end thereof. The purpose of this conductor will be explained shortly. Finally a rotational axis 32 of the hinge element is shown straight through the middle of the second cylindrical antenna element 24. The second antenna element thereby encircles the rotational axis. As stated earlier the hinge includes two screened cables in the joint at the first end 17, where the screening of a first of these cables interconnects the first and second antenna elements and the screening of a second cable interconnects the second and third antenna elements. Because of this electrical elements being provided in the first and second parts as well as in the hinge can be connected to each other at all times via conductors in the interior of theses cables without disturbing the antenna impedance. Because of this it is furthermore possible to have several conductors connected between the first and second parts without extensive radio frequency decoupling of these conductors while still having the antenna functioning. How these conductors can be provided under the first, second and third antenna elements 24, 24 and 26, which elements thus provides shielding for the conductors, is shown with dotted lines in FIG. 5.

Figure 6:
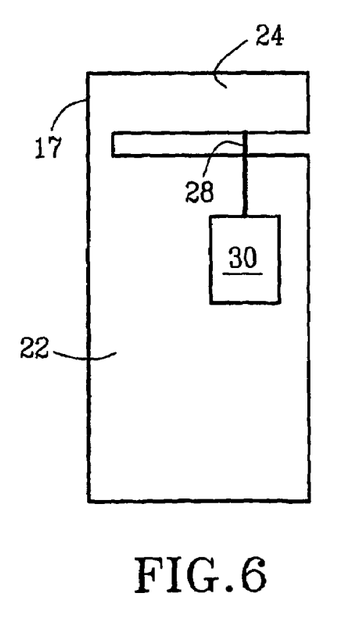

FIG. 6 schematically shows a top view of the antenna elements in the clamshell phone according to the first embodiment of the invention, when the phone is in a closed position. The third antenna element is now folded so that it is placed in parallel with the first antenna element 22 and not visible in the figure. However it will not influence the performance of the antenna in any significant way, the reasons of which will become apparent in the description in relation to FIG. 7.

The first antenna element 22 is in the form of an end-fed main circuit board provided in the middle of the phone and extending a length along the side of the phone as far as possible from the bottom side up to a small distance from the top side. In the ideal case it extends all the way from the bottom side up to the top side. The second antenna element 24 is, as was explained previously, provided as a cylinder within the hinge element, and is electrically connected at the first end 17 to the first antenna element 22. A radio circuit 30 is connected between the second antenna element 24 at its second end via the insulated wire 28 and the first antenna element 22 at the top end of the main circuit board, i.e. the end closest to the second antenna element 24. The wire 28 thus bridges the gap provided between the first and second antenna elements 22 and 24. In this embodiment the connection point between the radio circuit and the first and second antenna elements 22 and 24 is provided close to the second end of the hinge element, although this can be varied for other embodiments of the invention. The second antenna element 24 is thus provided near the feed end of the first antenna element 22. As is shown the radio circuit 30 is provided on the circuit board, i.e. on the first antenna element 22.

The radio circuit 30 feeds the main circuit board as antenna using the second antenna element 24 as counterpoise within a certain frequency band used by the phone. How this feeding can be done is disclosed in more detail in WO-0237600, which is herein incorporated by reference. In a preferred embodiment the circuit board has a length approaching a half wavelength at the operating frequency band (e.g. around 900 MHz for a cellular phone working in one frequency band of the GSM specification). It can also be equal to the full wavelength. It does not have to have these lengths in order to function, though. In this closed position of the phone the third antenna element does not influence the performance of the antenna. By providing the second antenna element 24 in the hinge, the first antenna element is allowed to take up more space than previously and can therefore have a better performance and also better broadband properties.

Figure 7:
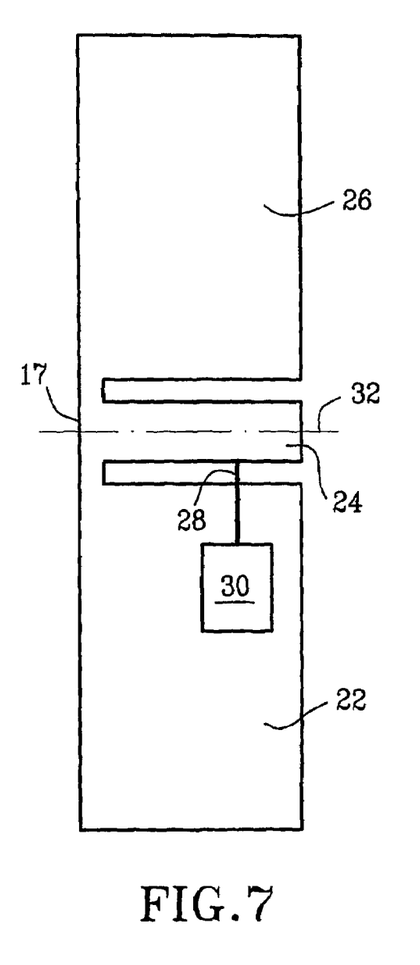

FIG. 7 schematically shows a top view of the antenna elements in the clam-shell phone according to the first embodiment of the invention, when the phone is in a open position. Here the first axis 32 is again shown going straight through the second antenna element. The bottom part is identical to what is shown in FIG. 6, while now the third antenna element 26 is shown provided in the second part of the phone. The change in antenna impedance between open and closed positions depends essentially on the coupling between the first and the second antenna elements 24 and 26 in open position. The aim is to allow for screened cable connections between the first, second, and third antenna elements 22, 24 and 26 without an adverse change in impedance between the two positions. The coupling is caused by direct electrical contact between the second and third antenna elements 24 and 26 and capacitive and inductive coupling over the non-conducting gap between the elements. In the closed position, the first and third antenna elements 22 and 26 are electrically one element and the screened cable connection between the second and third antenna elements 24 and 26 is placed in the same joint as the screened cable connection between the first and the second antenna elements 22, and 24. Sufficiently low coupling can be achieved in open position depending on the dimensions of the elements and the width of the gaps. The two gaps are dimensioned such that their length and impedance allow the antenna system to be fed at the second end with an intended radio frequency bandwidth. The electrical coupling to the third antenna element is sufficiently small to allow the antenna impedance to stay within limits for broadband performance and the antenna to work well both in open and closed modes. The third antenna element is preferably provided in the form a circuit board in the same way as the first antenna element. By having this third antenna element in the second part of the phone a better wideband performance is achieved in the antenna arrangement than would otherwise be possible.

Figure 8:
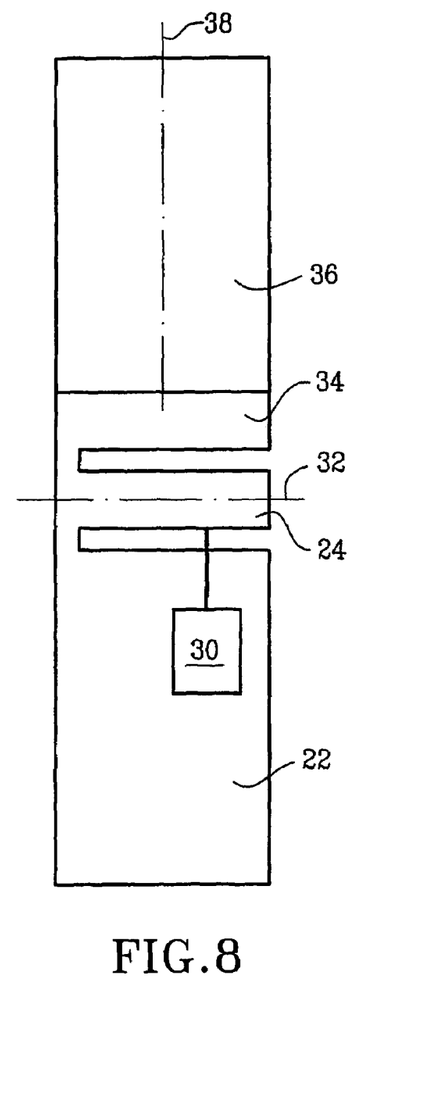

FIG. 8 schematically shows a top view of antenna elements in a clam-shell phone according to a second embodiment of the invention, when the phone is in an open position. Here the second part of the phone is divided into a first section connected to the hinge element and a second section connected to the first section. The first section is provided with hinging means providing a second axis 38 around which the second section of the second part can be rotated. The second axis 38 is provided essentially at right angles to the first axis 32. The third antenna element is therefore here divided into a first section 34 provided in the first section of the second part of the phone and connected to the second antenna element 24 and a second section 36 provided in the second section of the second part of the phone and arranged to rotate around the second axis 38. The first and second sections 34 and 38 of the third antenna element have a continuous contact over the entire interface between the first and second sections of the second part of the phone when one of these part is not rotated in relation to the other part or rotated by 180 degrees. Because of this the influence of these parts on the antenna impedance is the same. Independently of if the second section of the second part of the phone is rotated or not. That means that the third antenna element has the same size even if a section has been rotated by 180 degrees in relation to the other section.

Figure 9:
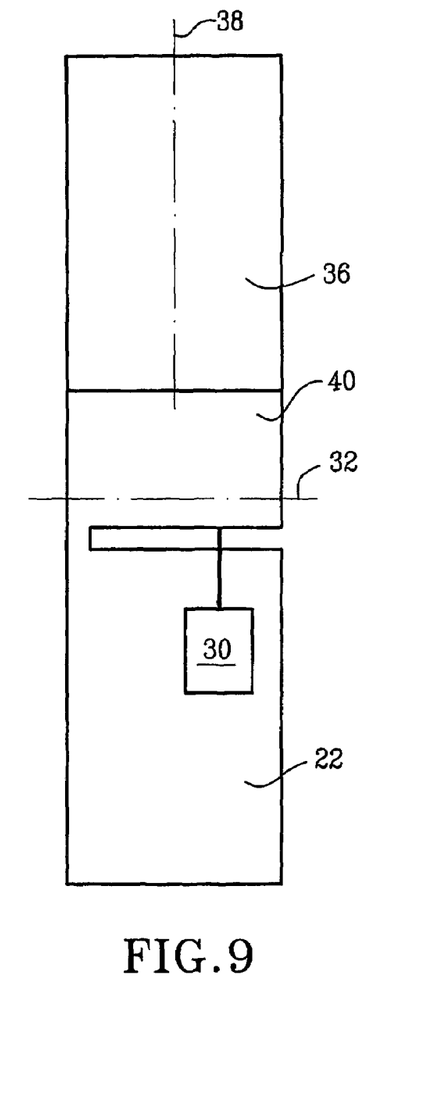

FIG. 9 schematically shows a top view of antenna elements in a clam-shell phone according to a third embodiment of the invention, when the phone is in an open position. Here the second and third antenna elements are electrically connected by breakable electrical contacts along the entire interface between the second and third antenna elements. This means that there are electrical connections between the second and third antenna elements all along the hinge element when the phone is in the open position. Thus there is no gap between the first section of the third antenna element and the second antenna element. Therefore the second antenna element can be seen as including the third antenna element, having a first part 40 including the first axis 32 and a second part 36 rotatable round the second axis. Also here the rotation round the second axis 38 has no or little influence on the performance of the antenna. Because the second antenna element now is much larger, it provides a substantial part of the antenna, which is now more or less a dipole antenna when in the open position and therefore has a better antenna efficiency. When the phone is folded, the electrical contacts are broken, except for where the second and third antenna elements are electrically connected at the first end of the hinge element, this makes the antenna function like the antenna shown in FIG. 6 when being folded.

Figure 10:
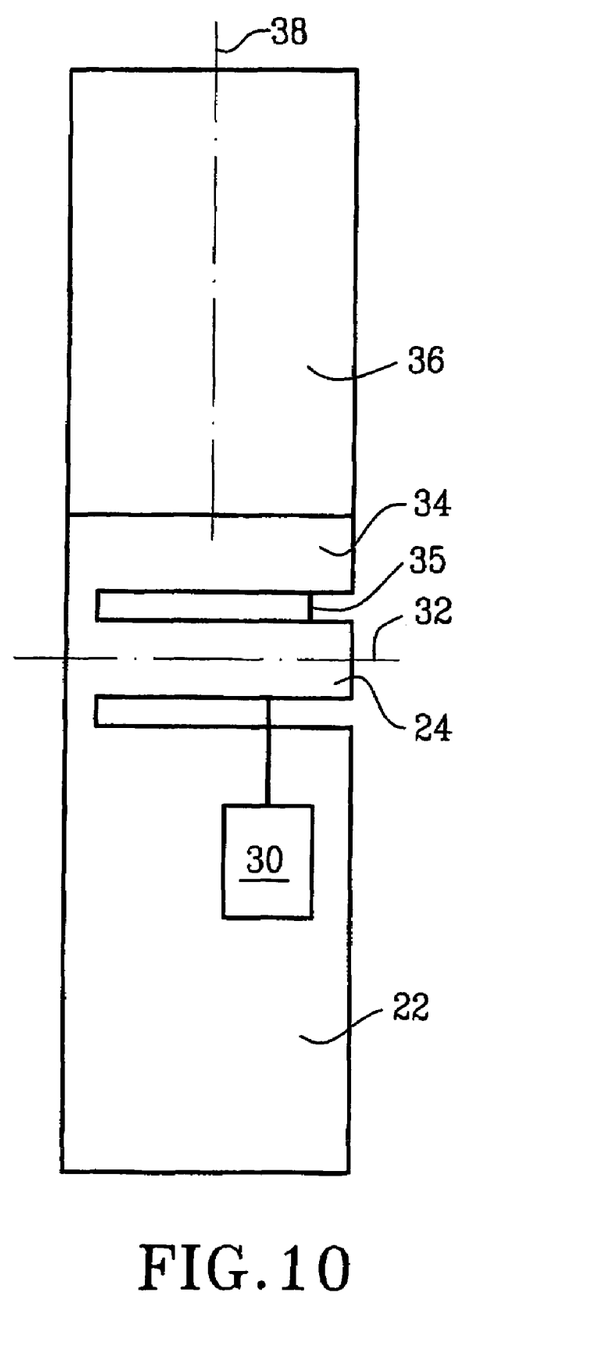

FIG. 10 schematically shows a top view of antenna elements in a clamshell phone according to a fourth embodiment of the invention, when the phone is in an open position. This is yet another variation in order to provide a dipole antenna when the phone is in the open position. There is only one difference between FIG. 8 and FIG. 10 and that is that there is just one breakable electrical connection in the form of an electrical conductor 35 provided between the second end of the second antenna element 24 and a corresponding second end of the third antenna element 34 and 38 facing the second antenna element. The electrical connection is being broken when the phone is folded. As in the third embodiment of the invention, also here a dipole antenna is provided by the second and third antenna elements, when in an open and an antenna like the one in FIG. 6 when the phone is folded.

Because of the size of the antenna structure of the present invention, the antenna is easily driven in many frequency bands, for instance GSM/900/1800, PCS 1900, UMTS bands and even GPS bands. The different frequency bands are easily provided through the radio circuit including a tuning filter or a tuning network in order to provide the different frequency bands.

The present invention has many advantages. It provides more space for the first antenna element than previously known structures because it allows the placing of the second antenna element in the hinge. The antenna structure allows better wideband performance because of the third antenna element, which has no real influence on the performance when being folded, but adds to the wideband properties. The antenna efficiency is furthermore not degraded because of rotating or twisting the second section of the second part of the phone round the second axis. The third and fourth embodiments of the present invention furthermore provide an antenna that has an even better performance in the open position. The present invention furthermore allows multi-conductor connection to the second part without needing extensive decoupling of the cables/conductors and just using the screening to have the antenna functioning.

The present invention can be varied in many ways in addition to those mentioned in relation to different embodiments of the invention. The connection point between radio circuit and second antenna element does not have to be provided at the second end of the hinge element, but can be provided somewhere in-between these ends, where the place is chosen for obtaining the best dimensioning of the antenna impedance. The same reasoning applies to the fourth embodiment of the invention, i.e. the placing of the second screened conductor between the second and the third antenna elements. This conductor can also be provided at a position along the gap, which provides the best impedance. The third embodiment does also not have to have a continuous connection along the whole gap. It might be implemented with a few discrete conductors placed at distances from each other or be continuously provided along parts of the gap. The connection point furthest from the first end of the element might furthermore be provided somewhere along the gap, where the best impedance is achieved. The first and third antenna elements are here provided in the form of the circuit boards. They can just as well be provided as the shielding, casing or metallic parts of the two parts of the phone. They do not have to extend along the whole of the first and second parts, but can be provided in a majority of them. The second antenna element does not have to have to have a cylindrical form and it does not have to be hollow. It is however essential that it is placed in the hinge element.

The invention claimed is:

1. A portable communication device comprising:
   a first part comprising a first antenna element located within and extending through a portion of the first part and radio circuit feeding antenna elements;
   a second part hingedly joined to an end of the first part for providing at least one open and one closed position of the phone;
   a hinge element connected to the first and second parts, stretching along the end of the first part for providing rotation of one of the first and second parts in relation to the other one of the first and second parts around a first axis and having a first and second end, wherein a second antenna element is provided in the interior of the hinge element;
   a third antenna element located within and extending through a portion of the second part and being electrically connected to the second antenna element at least at the first end of the hinge element; and
   a radio circuit connected between the first and second antenna elements.

2. The portable communication device according to claim 1, wherein the second antenna element encircles the axis of rotation defined by the hinge element.

3. The portable communication device according to claim 1, wherein the radio circuit is connected to the second antenna element between the first and second ends of the hinge element.

4. The portable communication device according to claim 3, wherein the radio circuit is connected to the second antenna element in proximity of the second end of the hinge element.

5. The portable communication device according to claim 1, wherein the radio circuit is connected to the first antenna element at approximately the connecting point between the second antenna element and the radio circuit.

6. The portable communication device according to claim 1, wherein the first antenna element is electrically connected to the second antenna element at the first end of the hinge element so as to provide a gap between the first and second antenna elements, the length of which is substantially defined by the first and second ends of the hinge element.

7. The portable communication device according to claim 6, wherein the electrical connection between the first and second antenna elements provides a screen for conductors provided between at least the first part and the hinge.

8. The portable communication device according to claim 7, wherein the electrical connection between the first and second antenna elements is provided by screening of a screened cable.

9. The portable communication device according to claim 1, wherein the connection between the second and third antenna elements provides a screen for conductors provided between at least the second part and the hinge.

10. The portable communication device according to claim 9, wherein the electrical connection between the second and third antenna elements is provided by screening of a screened cable.

11. The portable communication device according to claim 1, wherein the second and third antenna elements are electrically connected at the first end of the hinge element so as to provide a gap between the third and second antenna elements, the length of which is substantially defined by the first and second ends of the hinge element.

12. The portable communication device according to claim 1, wherein the third and second antenna elements are provided with at least one connection configured to interconnect the third and second antenna elements when in the open position of the device and to disconnect the third and second antenna elements when the device is in the closed position.

13. The portable communication device according to claim 12, wherein the at least one connection is a continuous connection substantially provided along the entire length of the hinge element.

14. The portable communication device according to claim 12, wherein the at least one connection comprises a plurality of connections configured to interconnect the third and second antenna elements when in the open position of the device and to disconnect the third and second antenna elements when the device is in the closed position.

15. The portable communication device according to claim 1, wherein the second part comprises a first section connected to the hinge element and a second section, the second section being rotatable around a second axis in relation to the first section, said second axis being provided substantially perpendicular to the first axis.

16. The portable device according to claim 15, wherein the third antenna element comprises a first and second section, the first section of the third antenna element being provided in the first section of the second part and the second section of the third antenna element being provided in the second section of the second part, said first and second sections of the third antenna element being electrically connectable to each other along substantially the entire interface between the first and second sections of the second part.

17. The portable device according to claim 1, wherein the radio circuit comprises at least one tuning network for tuning the antenna elements to one or more frequency bands.

18. The device according to claim 1, wherein the device is a cellular phone.

19. An antenna arrangement for use in a portable communication device having a first part comprising antenna elements, a second part hingedly joined to an end of the first part, and a hinge element connected to the first and second parts and providing an open and a closed position of the portable communication device, the hinge element stretching along the end of the first part for providing rotation of one the first and second parts in relation to the other one of the first and second parts around a first axis and having a first and second end, wherein the antenna arrangement comprises:

- a first antenna element located within and extending through a portion of the first part of the portable communication device and connected to the radio circuit;
- a second antenna element located in the interior of the hinge element of the portable communication device and also connected to the radio circuit, and
- a third antenna element located within and extending through a portion of the second part and electrically connected to the second antenna element at least at the first end of the hinge element.

* * * * *

UNITED STATES PATENT AND TRADEMARK OFFICE
CERTIFICATE OF CORRECTION

| | |
|---|---|
| PATENT NO. | : 7,209,084 B2 |
| APPLICATION NO. | : 10/536598 |
| DATED | : April 24, 2007 |
| INVENTOR(S) | : Lindell |

It is certified that error appears in the above-identified patent and that said Letters Patent is hereby corrected as shown below:

<u>On the Title Page, Item (30)</u>

Foreign Application Priority Data:
 Please correct "02026232"
  To read --02026232.5--

Signed and Sealed this

Seventh Day of August, 2007

JON W. DUDAS
*Director of the United States Patent and Trademark Office*